United States Patent [19]
Lillegard

[11] Patent Number: 6,115,324
[45] Date of Patent: Sep. 5, 2000

[54] TRANSMIT MEMORY FOR ULTRASOUND

[75] Inventor: Gregory A. Lillegard, Greenfield, Wis.

[73] Assignee: General Electric Company, Milwaukee, Wis.

[21] Appl. No.: 09/223,992

[22] Filed: Dec. 31, 1998

[51] Int. Cl.[7] .................................................. G03B 42/06

[52] U.S. Cl. ................................................................ 367/11

[58] Field of Search .................................. 367/11, 7, 138; 600/437, 443

[56] References Cited

U.S. PATENT DOCUMENTS 6,005,827  12/1999  Hossack et al. ........................... 367/11

Primary Examiner—Daniel T. Pihulic
Attorney, Agent, or Firm—McAndrews, Held & Malloy; Christian G. Cabou; Phyllis Y. Price

[57] ABSTRACT

An ultrasonic imaging system includes a transmitter using a memory to store waveshape and frequency data for energizing a transducer array. The data for multiple waveshapes is simultaneously read from memory and decoded by a demultiplexer so that data for a selected one of the waveshape can be sent to transducer array.

20 Claims, 5 Drawing Sheets

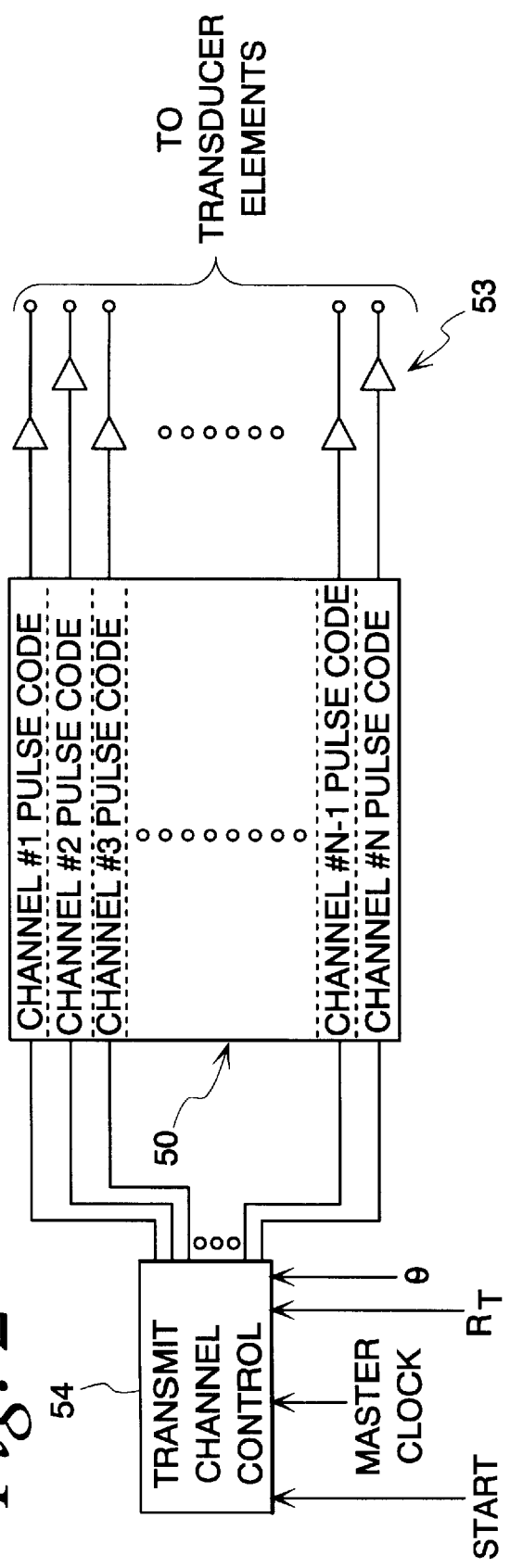
Fig. 2
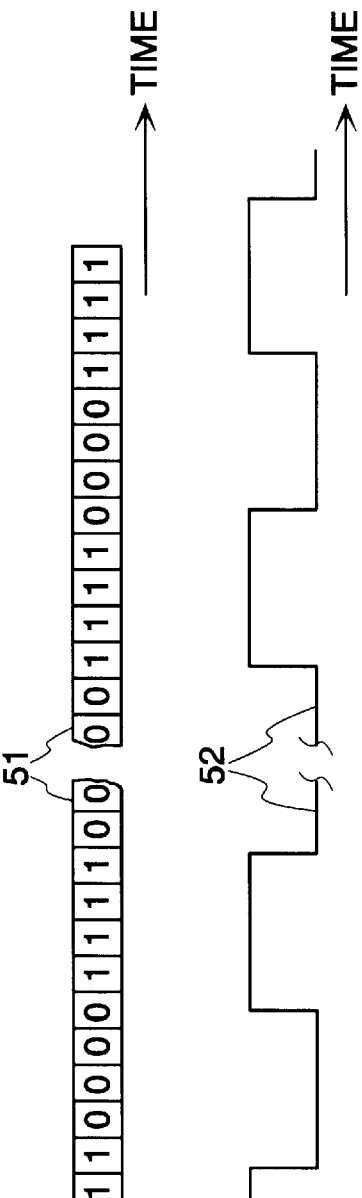
Fig. 2A
Fig. 2B

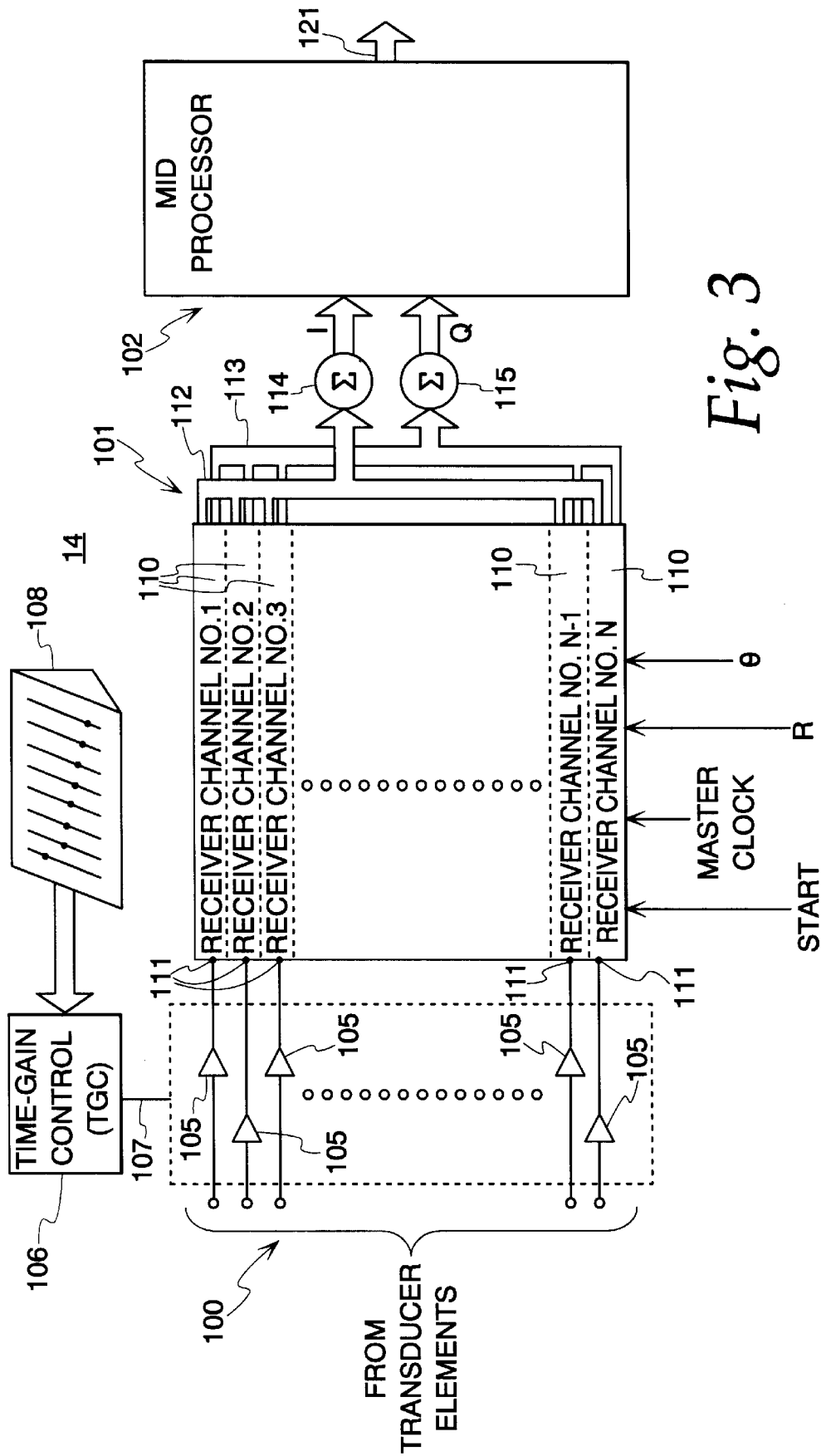

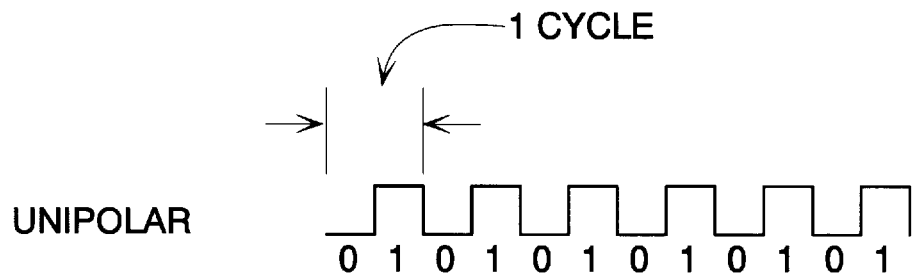
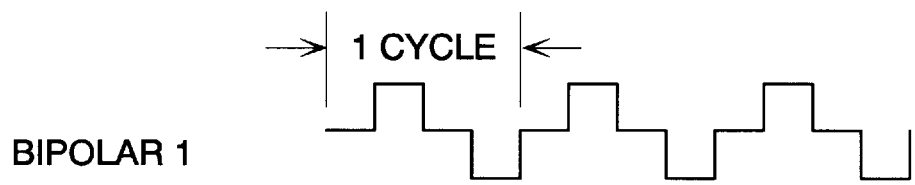
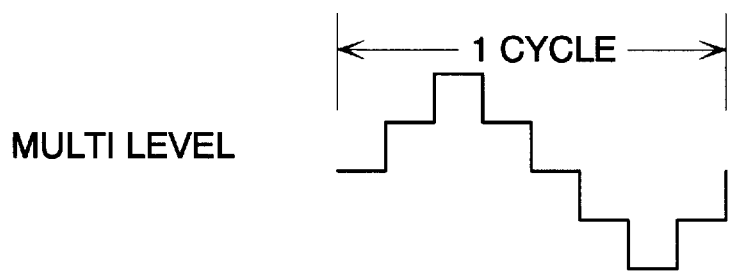
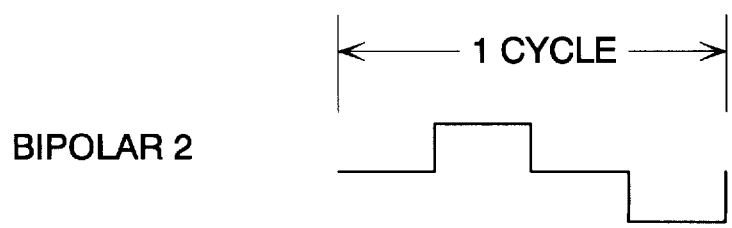
Fig. 4

TRANSMIT MEMORY FOR ULTRASOUND

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to acoustical imaging and, more specifically, relates to a transmitter for generating ultrasound waves.

Digital ultrasound scanners typically must handle a wide variety of transmit frequencies and waveforms for different clinical applications. It is advantageous to have multiple waveforms simultaneously loaded to facilitate quick changes between different applications. Assuming a fixed clock applies words of transmit data to the transmit circuitry, the characteristic definition of each of these waveforms inefficiently consumes memory. Low frequency waveforms need more words of data than high frequency waveforms. Complicated waveforms require more bits per word than simple square waves. Moreover, as clinical techniques advance, the mixture of desired waveforms changes, making it impossible to accurately predict the needed memory structures. A flexible transmit memory is needed to efficiently handle all of these waveforms.

BRIEF SUMMARY OF THE INVENTION

The present invention is useful in an ultrasound imaging system comprising a vibratory energy transducer. The transducer is energized to produce ultrasound waves by receiving a signal selecting a first waveshape from a group of waveshapes for energizing the transducer. The signal preferably is received by an input, such as a key switch operated by a user of the system. Clock signals are generated for defining clock cycles, preferably by a digital clock. Data is stored defining a plurality of waveshapes, including the first selected waveshape, preferably in a digital memory. Data representative of more than one of the plurality of waveshapes, including the first waveshape, is read from the memory on clock cycles, preferable by a memory addresser. The read data representing the first waveshape is selected, preferably by a selector, such as a demultiplexer. The selected data is conditioned so that the transducer produces ultrasound waves corresponding to the first waveshape.

The preferred embodiment allows efficient use of available transmit memory and enables use of memory locations which are as short as the shortest desired waveform, but allow the waveform definition to cover a number of consecutive locations to accommodate the longest waveform. This eliminates the problem of unused words of memory at the end of a short transmit waveform in a long (or deep) bank of memory locations. Several simple waveforms and more complex waveforms can be stored together efficiently in one bank of memory. This eliminates the problem of unused bits of memory for simple transmit waveforms in wide banks of memory locations. For example, four uni-polar square waves can be stored on the same space as one 4-bit wide waveform.

BRIEF DESCRIPTION OF THE DRAWINGS

FIG. 2 is a schematic block diagram of a transmitter which forms part of the system of FIG. 1.

FIGS. 2A and 2B are graphical representations of the signal in any of the channels of transmitter 50 of FIG. 2.

FIG. 3 is a schematic block diagram of a receiver which forms part of the system of FIG. 1.

FIG. 4 is a diagram showing digital data representing waveshapes useful for energizing the transducer array shown in FIG. 1.

DETAILED DESCRIPTION OF THE INVENTION

Figure 1:
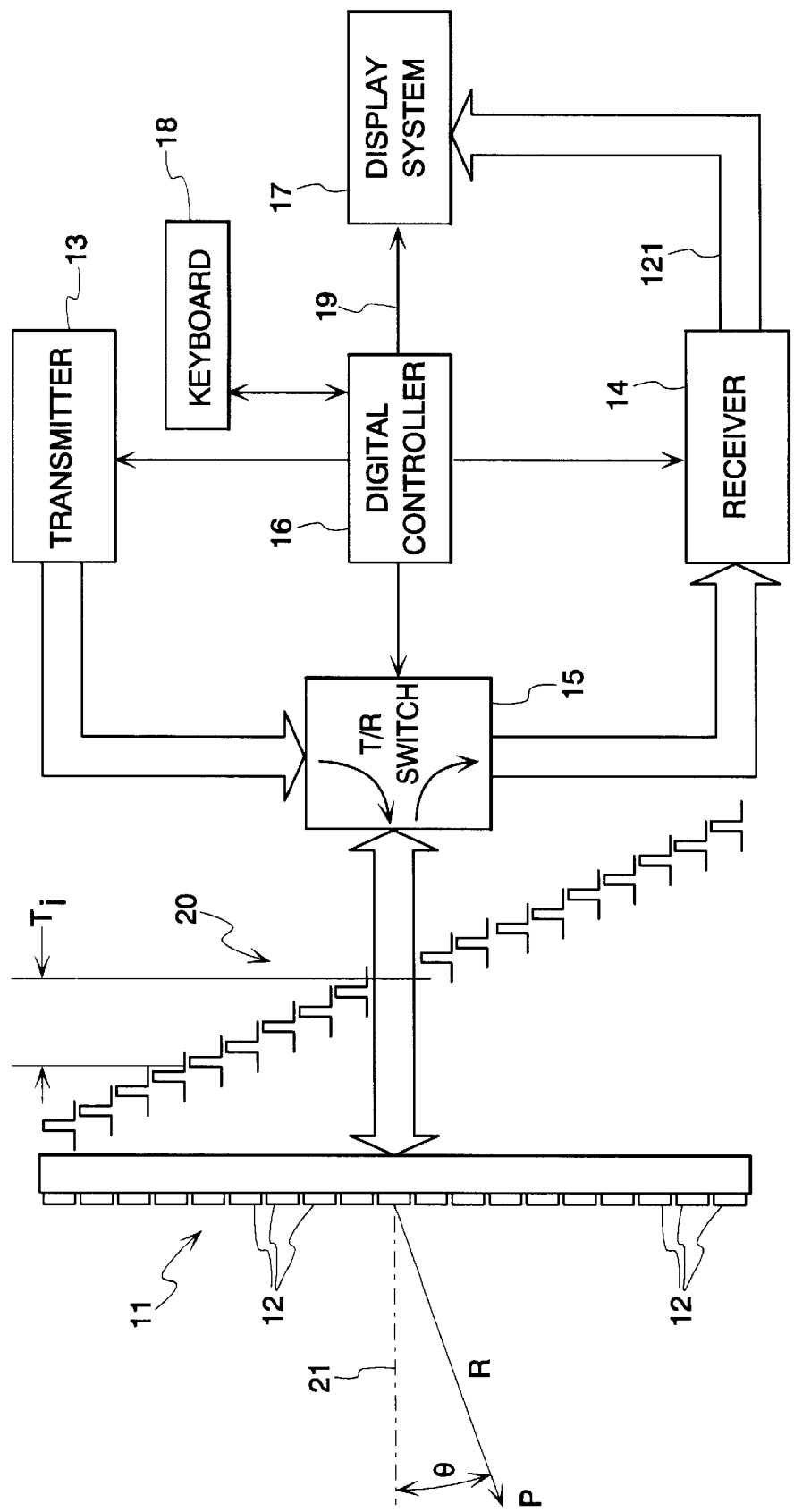
FIG. 1 is a schematic block diagram of an ultrasonic imaging system employing a preferred embodiment of the present invention.

Referring to FIG. 1, a vibratory energy imaging system includes a transducer array 11 comprised of a plurality of separately driven elements 12 which each produce a burst of ultrasonic energy when energized by a pulsed waveform produced by a transmitter 13. The ultrasonic energy reflected back to transducer array 11 from the subject under study is converted to an electrical signal by each transducer element 12 and applied separately to a receiver 14 through a set of transmit/receive (T/R) switches 15. Transmitter 13, receiver 14 and switches 15 are operated under control of a digital controller 16 responsive to commands by a human operator. A complete scan is performed by acquiring a series of echoes in which switches 15 are sent to their transmit position, transmitter 13 is gated on momentarily to energize each transducer element 12, switches 15 are then set to their receive position, and the subsequent echo signals produced by each transducer element 12 are applied to receiver 14. The separate echo signals from each transducer element 12 are combined in receiver 14 to produce a single echo signal which is employed to produce a line in an image on a display system 17.

Transmitter 13 drives transducer array 11 such that the vibrational energy produced, e.g., ultrasonic energy, is directed, or steered, in a beam. A B-scan can therefore be performed by moving this beam through a set of angles from point-to-point rather than physically moving transducer array 11. To accomplish this, transmitter 13 imparts a time delay ($T_i$) to the respective pulsed waveforms 20 that are applied to successive transducer elements 12. If the time delay is zero ($T_i=0$), all the transducer elements 12 are energized simultaneously and the resulting ultrasonic beam is directed along an axis 21 normal to the transducer face and originating from the center of transducer array 11. As the time delay ($T_i$) is increased as illustrated in FIG. 1, the ultrasonic beam is directed downward from central axis 21 by an angle θ. The relationship between the time delay $T_i$ applied to each $i^{th}$ signal from one end of the transducer array (i=1) to the other end (i=n) is given by the following relationship:

$$T = R_T/c - \sqrt{(R_{T/c})^2 + (x/c)^2 - 2 x R_T \sin\theta/c^2} \quad (1)$$

where:
x=distance of center of transducer element 12 from center of transducer array;
θ=transmit beam angle,
c=velocity of sound in the object under study, and
$R_T$=range at which transmit beam is focused.

The time delays $T_i$ in equation (1) have the effect of steering the beam in the desired angle θ, and causing it to be focused at a fixed range $R_T$. A sector scan is performed by progressively changing the time delays $T_i$ in successive excitations. The angle θ is thus changed in increments to steer the transmitted beam in a succession of directions. When the direction of the beam is above central axis 21, the timing of pulses 20 is reversed, but the formula of equation (1) still applies.

Referring still to FIG. 1, the echo signals produced by each burst of ultrasonic energy emanate from reflecting objects located at successive positions (R) along the ultrasonic beam. These are sensed separately by each segment 12 of transducer array 11 and a sample of the magnitude of the echo signal at a particular point in time represents the amount of reflection occurring at a specific range (R). Due to the differences in the propagation paths between a reflecting point P and each transducer element 12, however, these echo signals will not occur simultaneously and their amplitudes will not be equal. The function of receiver 14 is to amplify and demodulate these separate echo signals, impart the proper time delay and phase shift to each and sum them together to provide a single echo signal which accurately indicates the total ultrasonic energy reflected from point P located at R along the ultrasonic beam oriented at the angle θ.

To simultaneously sum the electrical signals produced by the echoes from each transducer element 12, time delays and phase shifts are introduced into each separate transducer element channel of receiver 14. The beam time delays for reception are the same delays ($T_i$) as the transmission delays described above. However, in order to dynamically focus, the time delay and phase shift of each receiver channel is continuously changing during reception of the echo to provide dynamic focusing of the received beam at the range R from which the echo signal emanates. The exact equation for the time delay $T_d$ imposed on the signal received by each transducer element is as follows:

$$T_d = t/2 - \sqrt{(t/2)^2 + (x/c)^2 - (xt/c)\sin\theta} \qquad (2)$$

where:

t=elapsed time after transmission of sound from center of transducer array (i.e., START), c=velocity of sound in the object under study, θ=beam angle, and x=distance of center of element from center of transducer array.

The same calculation, suitably scaled, also provides the correct phase shift.

Under direction of digital controller 16, receiver 14 provides delays during the scan such that steering of receiver 14 tracks with the direction θ of the beam steered by transmitter 13 and it samples the echo signals at a succession of ranges R and provides the proper delays and phase shifts to dynamically focus at points P along the beam. Thus, each emission of an ultrasonic pulse waveform results in the acquisition of a series of data points which represent the amount of reflected sound from a corresponding series of points P located along the ultrasonic beam.

Display system 17 receives the series of data points produced by receiver 14 and converts the data to a form producing the desired image. For example, if an A-scan is desired, the magnitude of the series of data points is merely graphed as a function of time. If a B-scan is desired, each data point in the series is used to control brightness of a pixel in the image, and a scan comprised of a series of measurements at successive steering angles (θ) is performed to provide the data necessary for display.

Referring to FIG. 2 in conjunction with FIG. 1, transmitter 13 includes a set of channel pulse code memories indicated collectively as memories 50. In the preferred embodiment there are 128 separate transducer elements 12, and therefore, there are 128 separate channel pulse code memories 50. Each pulse code memory 50 is typically an N by M memory which stores multiple-bit patterns representing multiple waveshapes at multiple frequencies, such as bit pattern 51, that determine waveshape and the frequency of the ultrasonic pulses 52, such as unipolar pulses 52, to be produced. In the preferred embodiment, this bit pattern is read out of each pulse code memory 50 by a 40 MHz master clock and applied to a driver 53 which amplifies the signal to a power level suitable for driving transducer 11. In the example shown in FIG. 2a, the bit pattern is a sequence of four "1" bits alternated with four "0" bits to produce a 5 MHz ultrasonic pulse 52; however, other carrier frequencies ($F_O$) may be employed in the preferred embodiment, such as 2.5, 3.75, 6.25, 7.5, 8.75 and 10 MHz. Transducer elements 12 to which these ultrasonic pulses 52 are applied respond by producing ultrasonic energy. If all 512 bits are used, a pulse of bandwidth as narrow as 40 kHz centered on the carrier frequency (i.e. 5 MHz in the example) will be emitted.

A keyboard 18 operated by a user provides an input to receive a signal selecting the type of waveshape and frequency for energizing transducer array 11.

As indicated above, to steer the transmitted beam of the ultrasonic energy in the desired direction (θ), pulses 52 for each of the n channels, such as shown in FIG. 2B, must be delayed by the proper amount. These delays are provided by a transmit control 54 which receives four control signals (START, MASTER CLOCK, $R_T$ and θ) from digital controller 16 (FIG. 1). Using the input control signal θ, the fixed transmit focus $R_T$, and the above equation (1), transmit control 54 calculates the delay increment $T_i$ required between successive transmit channels. When the START control signal is received, transmit control 54 gates one of four possible phases of the 40 MHz MASTER CLOCK signal through to the first transmit channel 50. At each successive delay time interval ($T_i$) thereafter, the 40 MHz MASTER CLOCK signal is gated through to the next channel pulse code memory 50 until all n=128 channels are producing their ultrasonic pulses 52. Each transmit channel 50 is reset after its entire bit pattern 51 has been transmitted and transmitter 13 then waits for the next θ and next START control signals from digital controller 16. As indicated above, in the preferred embodiment of the invention a complete B-scan is comprised of 128 ultrasonic pulses steered in Δθ increments of 0.70° through a 90° sector centered about central axis 21 (FIG. 1) of the transducer 11.

For a detailed description of the transmitter 13, reference is made to commonly assigned U.S. Pat. No. 5,014,712 issued May 14, 1991 and entitled "Coded Excitation For Transmission Dynamic Focusing of Vibratory Energy Beam" incorporated herein by reference.

Referring particularly to FIG. 3, receiver 14 is comprised of three sections: a time-gain control section 100, a receive beam forming section 101, and a mid processor 102. Time-gain control (or TGC) section 100 includes an amplifier 105 for each of the n=128 receiver channels and a time-gain control circuit 106. The input of each amplifier 105 is connected to a respective one of transducer elements 12 to amplify the echo signal which the element receives. The amount of amplification provided by amplifiers 105 is controlled through a control line 107 that is driven by TGC circuit 106. As is well known in the art, as the range of the echo signal increases, its amplitude is diminished. As a result, unless the echo signal emanating from more distant reflectors is amplified more than the echo signal from nearby reflectors, the brightness of the image diminishes rapidly as a function of range (R). This amplification is controlled by the operator who manually sets eight (typically) TGC linear potentiometers 108 to values which provide a relatively uniform brightness over the entire range of the section scan. The time interval over which the echo signal is acquired determines the range from which it emanates, and this time interval is divided into eight segments by TGC circuit 106. The settings of the eight potentiometers are employed to set the gains of amplifiers 105 during each of the eight respective time intervals so that the echo signal is amplified in ever increasing amounts over the echo signal acquisition time interval.

The receive beam forming section 101 of receiver 14 includes n=128 separate receiver channels 110. As will be explained in more detail below, each receiver channel 110 receives the analog echo signal from one of amplifiers 105 at an input 111, and it produces a stream of digitized output values on an I bus 112 and a Q bus 113. Each of these I and Q values represents a demodulated sample of the echo signal envelope at a specific range (R). These samples have been delayed and phase shifted such that when they are summed at summing points 114 and 115 with the I and Q samples from each of the other receiver channels 110, they indicate the magnitude and phase of the echo signal reflected from a point P located at range R on the steered beam (θ). In the preferred embodiment, each echo signal is sampled at 150 micrometer increments over the entire range of the scan line (typically 40 to 200 millimeters).

For a more detailed description of receiver 14, reference is made to commonly assigned U.S. Pat. No. 4,983,970, issued Jan. 8, 1991 and entitled "Method And Apparatus for Digital Phase Array Imaging", and U.S. Pat. No. 5,349,524 (Daft et al.), which are incorporated herein by reference.

Referring still to FIG. 3, mid processor section 102 receives the beam samples from summing points 114 and 115. The I and Q values of each beam sample are 20-bit digital numbers representing the in-phase and quadrature components of the magnitude of the reflected sound from a point (R,θ). Mid processor 102 can perform a variety of calculations on these beam samples, where choice is determined by the type of image to be reconstructed. For example, if a conventional magnitude image is to be produced, a detection logic unit is implemented in which a digital magnitude M is calculated from each receive beam sample and produced at output 121 along with the R, θ coordinates of the reflection point, according to $$M=\sqrt{I^2-Q^2} \qquad (3)$$

Detection logic unit 120 may also implement correction methods such as that disclosed in commonly assigned U.S. Pat. No. 4,835,689, issued May 30, 1989 and entitled "Adaptive Coherent Energy Beam Formation Using Phase Conjugation". Such correction methods examine the received beam samples and calculate corrective values that can be used in subsequent measurements by transmitter 13 and receiver 14 to improve beam focusing and steering. Such corrections are necessary, for example, to account for the nonhomogeneity of the media through which the sound from each transducer element travels during a scan.

FIG. 4 illustrates data representing and defining a plurality of waveshapes suitable for energizing transducer array 11 (FIG. 1). For the unipolar waveshape, an entire period of the waveshape can be represented by a zero-bit and a one-bit generated in two consecutive clock cycles.

A first type of bipolar waveshape (bipolar 1) can be represented by pairs of bits representing the positive and negative portions of the waveshape as illustrated in FIG. 4. A complete period of the bipolar 1 type of waveshape can be represented by four pairs of bits generated in four consecutive clock cycles.

A second type of bipolar wave form (bipolar 2) has a single period which can be defined by pairs of bits received over eight clock cycles. The bipolar 2 waveshape operates at one half of the frequency of the bipolar 1 waveshape.

A multilevel waveshape has a period which can be defined by two pairs of bits received over eight clock cycles as shown in FIG. 4. One pair of the bits (Positive 2 and Positive 1) represents the positive portion of the waveshape. The other pair of bits (Negative 1 and Negative 2) represents the negative portion of he waveshape.

Figure 5:
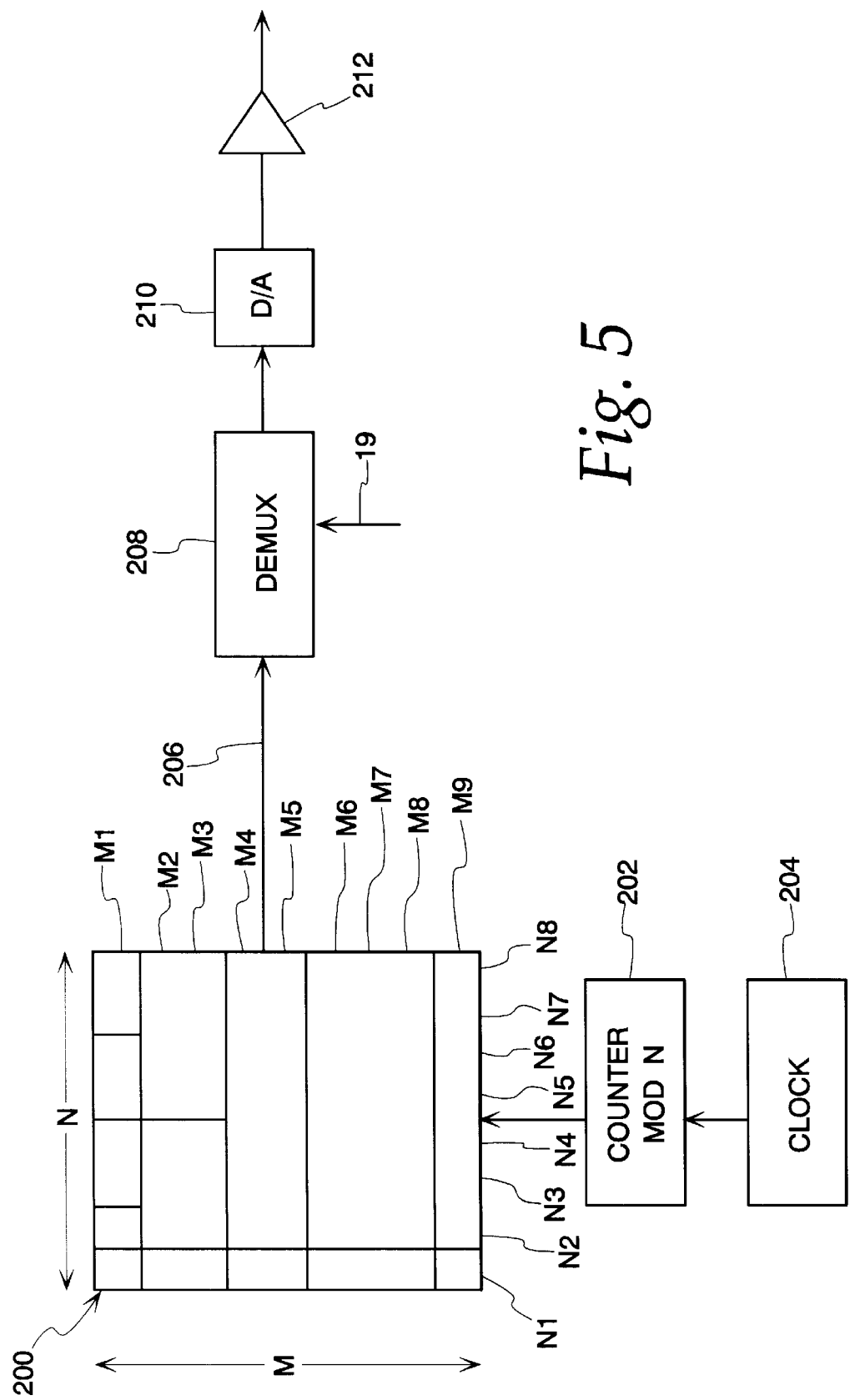
FIG. 5 is a schematic block diagram of a preferred form of apparatus for the transmitter shown in FIGS. 1 and 2.

Referring to FIG. 5, the data representing the various waveshapes from FIG. 4 can be advantageously stored in a computer memory 200 comprising N columns and M rows. In the example shown in FIG. 5, N=8 and M=9. As a result, four cycles of the unipolar waveshape data can be stored in row M1 and two cycles of the bipolar 1 waveshape data can be stored in rows M2 and M3. A single cycle of bipolar 2 waveshape data can be stored in rows M4 and M5, and a single cycle of multilevel waveshape data can be stored in rows M6–M9.

When the data is stored in the foregoing manner, then any column, such as column N1, includes data defining a portion of each of the unipolar, bipolar, bipolar2, and multilevel waveshape data.

Cycles of unipolar waveshape data are held in column pairs N1, N2; N3, N4; N5, N6; and N7, N8. Two cycles of bipolar 1 waveshape data are held in columns N1–N4 and N5–N8. A single cycle of bipolar 2 waveshape data is held in columns N1–N8, and a single cycle of the multilevel waveshape data is held in columns N1–N8.

An addresser for memory 20 is provided in the form of a modulo N counter 202. Counter 202 is programmable so that it can begin its counting cycle in any one of columns N1–N8. Counter 202 counts consecutively from one column to the next until it has counted through 8 columns, at which point the counter automatically resets to begin counting again at the column at which it began its sequence of counting.

Counter 202 is operated by a conventional digital clock 204 which defines the clock cycles referred to in connection with FIG. 4. For example, the unipolar wave form shown in FIG. 4 produces a zero-bit and a one-bit on consecutive cycles of clock 204.

Counter 202 causes the data in columns N1–N8 to be consecutively read out of memory 200 to a 9-bit bus 206 which transmits the read data to a conventional demultiplexer circuit 208.

Demultiplexer 208 receives control signals from digital controller 16 over a bus 19 (FIG. 1). The bus includes the information from keyboard 18 which selects the data for the waveshape and frequency desired by the operator. In response to the data on bus 19, the demultiplexer selects one group of bits from bus 206 representing the data selected by the operator through keyboard 18. For example, if the operator desires the multilevel wave form, demultiplexer 208 selects bits from rows M6–M9 as they appear on bus 206.

The data selected by demultiplexer 208 is transmitted to a conventional digital to analog converter 210, and then is transmitted to a conventional drive amplifier 212.

Rather than using amplifier 212, the amplifying capability can be incorporated into drivers 53 described previously in connection with FIG. 2. The amplified data then is transmitted to the transducer elements as shown in FIGS. 2 and 1. In response to the waveshape signals, the transducer array 11 produces corresponding ultrasound waves by vibratory energy.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. In an ultrasound imaging system comprising a vibratory energy transducer, improved apparatus for energizing the transducer to produce ultrasound waves comprising in combination:

an input connected to receive a signal selecting a first waveshape from a group of waveshapes for energizing the transducer;

a clock generating clock signals defining clock cycles;

a memory addresser responsive to the clock signals;

a memory including memory locations storing data defining a plurality of waveshapes and responsive to the memory addresser to read from the memory on clock cycles data representative of more than one of the plurality of waveshapes including the first waveshape;

a selector connected to select the read data representing the first waveshape; and a data conditioner connected to condition the selected data so that the transducer produces ultrasound waves corresponding to the first waveshape.

2. Apparatus, as claimed in claim 1, wherein the input comprises one or more switches operable by a user.

3. Apparatus, as claimed in claim 1, wherein the memory locations are arranged in rows and columns, each column in a group of the columns storing data defining a portion of more than one of the plurality of waveshapes and each row of a group of the rows storing data defining more than one cycle of at least a portion of one of the plurality of waveshapes.

4. Apparatus, as claimed in claim 3, wherein the memory addresser comprises a counter.

5. Apparatus, as claimed in claim 4, wherein the counter comprises a modulo n counter wherein n equals the number of columns of the memory locations.

6. Apparatus, as claimed in claim 3, wherein the counter is programmable to begin a cycle of counting at any of the columns.

7. Apparatus, as claimed in claim 3, wherein the counter addresses the columns on consecutive clock cycles.

8. Apparatus, as claimed in claim 3, wherein the data in each column is read on consecutive clock cycles.

9. Apparatus, as claimed in claim 1, wherein the selector comprises a demultiplexer.

10. Apparatus, as claimed in claim 1, wherein the data conditioner comprises a digital to analog converter.

11. Apparatus, as claimed in claim 10, wherein the data conditioner further comprises an amplifier.

12. In an ultrasound imaging system comprising a vibratory energy transducer, a method for energizing the transducer to produce ultrasound waves comprising the steps of:

receiving a signal selecting a first waveshape from a group of waveshapes for energizing the transducer;

generating clock signals defining clock cycles;

storing data defining a plurality of waveshapes including the selected waveshape;

reading from the memory on clock cycles data representative of more than one of the plurality of waveshapes including the first waveshape;

selecting the read data representing the first waveshape; and conditioning the selected data so that the transducer produces ultrasound waves corresponding to the first waveshape.

13. A method, as claimed in claim 12, wherein the step of storing comprises the steps of:

storing the data in rows and columns;

storing in a group of the columns data defining a portion of more than one of the plurality of waveshapes; and storing in a group of the rows data defining more than one cycle of at least a portion of one of the plurality of waveshapes.

14. A method, as claimed in claim 13, wherein the step of reading comprises the step of addressing the columns.

15. A method, as claimed in claim 14, wherein the step of addressing comprises the step of selecting a column at which to begin the addressing.

16. A method, as claimed in claim 14, wherein the step of addressing comprises the step of addressing consecutive columns on consecutive clock cycles.

17. A method, as claimed in claim 13, wherein the step of reading comprises the step of reading all data in consecutive columns on consecutive clock cycles.

18. A method, as claimed in claim 12, wherein the step of selecting comprises the step of demultiplexing.

19. A method, as claimed in claim 12, wherein the step of conditioning comprises the step of converting the data from digital form to analog form.

20. A method, as claimed in claim 19, wherein the step of conditioning further comprises the step of amplifying.

* * * * *